United States Patent [19]

Linden et al.

[11] Patent Number: 5,551,030

[45] Date of Patent: Aug. 27, 1996

[54] METHOD AND APPARATUS FOR INTEGRATING APPLICATIONS IN A GRAPHICAL USER INTERFACE ENVIRONMENT WITH A RULES DATABASE

[75] Inventors: Thomas M. Linden, Los Gatos; Jon D. Reinke, San Jose; Frank B. Schmuck, Campbell, all of Calif.

[73] Assignee: International Business Machines Corporation, Armonk, N.Y.

[21] Appl. No.: 437,115

[22] Filed: May 2, 1995

Related U.S. Application Data

[63] Continuation of Ser. No. 987,230, Dec. 8, 1992, abandoned.

[51] Int. Cl.⁶ .................................................... G06F 17/30
[52] U.S. Cl. ................................. 395/600; 364/DIG. 1; 364/282.3; 364/286; 364/222.81
[58] Field of Search ............................................. 395/600

[56] References Cited

U.S. PATENT DOCUMENTS

| | | | |
|---|---|---|---|
| 4,333,144 | 6/1982 | Whiteside et al. | 364/200 |
| 4,694,396 | 9/1987 | Weisshaar et al. | 364/300 |
| 4,855,905 | 8/1989 | Estrada et al. | 364/200 |
| 5,047,923 | 9/1991 | Elstner et al. | 364/200 |
| 5,063,500 | 11/1991 | Shorter | 395/200 |
| 5,063,523 | 11/1991 | Vrenjak | 364/514 |
| 5,072,847 | 12/1991 | Fromme | 395/700 |
| 5,075,852 | 12/1991 | Siegel et al. | 395/700 |
| 5,107,443 | 4/1992 | Smith et al. | 395/158 |
| 5,179,700 | 1/1993 | Aihara et al. | 395/650 |
| 5,233,687 | 8/1993 | Henderson, Jr. et al. | 395/158 |
| 5,252,951 | 10/1993 | Tannenbaum et al. | 345/156 |
| 5,283,856 | 2/1994 | Gross et al. | 395/51 |
| 5,311,422 | 5/1994 | Loftin et al. | 364/401 |
| 5,412,772 | 5/1995 | Monson | 395/155 |
| 5,465,363 | 11/1995 | Orton et al. | 395/700 |

FOREIGN PATENT DOCUMENTS

| | | |
|---|---|---|
| 0469709 | 2/1992 | European Pat. Off. . |
| 2661525 | 10/1991 | France . |
| 235843 | 2/1990 | Japan . |

OTHER PUBLICATIONS

Hendershot et al., Virtual Communications Subsystem, IBM Technical Disclosure Bulletin, vol. 33, No. 12, May 1991.

*Primary Examiner*—Wayne Amsbury
*Attorney, Agent, or Firm*—James C. Pinter

[57] ABSTRACT

A method and apparatus are provided for integrating application programs and objects of the application programs in an integrated graphical user interface processing environment, such as a windows environment. The method and apparatus facilitate the integration without requiring modifications of the application program software, and without requiring that the application programs conform to any particular communication protocol. When a command input, such as a mouse click by a user in a windows environment, indicates that an object from one application is to be dropped onto a window in which another application is running, the properties of the window and the attributes of the object are used to search a rule database to identify a rule which is applicable to these particular types of object and application. The rule contains an action clause, which specifies various actions which are to be executed automatically, to invoke a desired operation by or related to the application program on the object. The action clause may include window event generating actions for simulating user input that invokes the desired operation by the application program, or actions that reference an external command file whose execution performs a desired operation related to the application program.

22 Claims, 5 Drawing Sheets

- window=pattern

The application window name must match pattern

- name=pattern

File name must match pattern

- ext=pattern

File name extension must match pattern (equivalent to name=.*\.pattern)

- dir=pattern

The fully qualified directory name must match pattern

- type=file-type

The file must be of the specified file-type:

d:   directory f:   regular non-executable file (no execute permission)

x:   executable (regular file with execute permission set)

F:   regular file (executable or non-executable)

p:   pipe c:   character special file b:   block special file s:   socket

FIG. 3

- exec=program-name [arg1 arg2 ...]

The program program-name is invoked with options: arg1 arg2 ...

- execwait=program-name [arg1 arg2 ...]

Same as exec, but waits for the program to end before continuing.

- cd=directory-name

The program is involked in directory directory-name. A rule without a cd keyword will run the program in the user's home directory.

- string="asciistring"

The sequence of asciistring KeyPress events is sent to the window on which the file is dropped.

- keypress=key

The KeyPress event key is sent to the window on which the file is dropped. Valid key symbol names are listed in /usr/include/X11/keysymdef.h. In addition, the modifiers Shift, Lock, Ctrl (or Control), Alt (or Mod1), Mod2, Mod3 and Mod5 may be used. For example: ShiftReturn, CtrlAltPrior.

- keyrelease=key

The KeyRelease event key is sent to the window on which the file is dropped. Valid key symbol names are the same as for keypress.

- key=key

The KeyPress event key followed by KeyRelease event key is sent to the window on which the file is dropped. Valid key symbol names are the same as for keypress.

- button=button-number

The ButtonPress event for Button button-number is sent to the window on which the file is dropped followed immediately by a ButtonRelease event. Button-number is in the range [1,5].

- buttondown=button-number

The ButtonPress event button-number is sent to the window on which the file is dropped.

- buttonup=button-number

The ButtonRelease event button-number is sent to the window on which the file is dropped.

FIG. 4A

- wait=s

Wait s seconds before sending the next event.
- popup=pattern

Find a window with a name matching pattern; send all subsequent key or button events to that window.
- result=result-code The specified result-code is returned to the directory manager program from which the file was dropped:

b: bad transfer (transfer aborted)

n: no target found c: file was copied m: file was moved e: file is being edited (default)

r: file was renamed or replaced d: pretend file was dropped on desktop

FIG. 4B

The symbol '$' represents a predefined macro that will be expanded as follows:

$f: The fully qualified path name of the file $d: The fully qualified directory name $D: Same as $d, except if the directory is the root directory, then $D will be replaced by an empty string (useful for constructs like $D/foo)

$e: The file name extension (everything after the last '.')

$s: The file name stem (file name without the extension)

$x,$y: Position on the screen where the file was dropped $g: Equivalent to "+$x+$y"

$G: Equivalent to "-geometry +$x+$y"

${name}: The value of the specified environment variable

FIG. 5

METHOD AND APPARATUS FOR INTEGRATING APPLICATIONS IN A GRAPHICAL USER INTERFACE ENVIRONMENT WITH A RULES DATABASE

This is a continuation of application Ser. No. 07/987,230 filed on Dec. 08, 1992, now abandoned.

FIELD OF THE INVENTION

The present invention generally relates to the field of processor operation and management. More specifically, the invention relates to communication between different types of application programs and user interfaces with application programs.

BACKGROUND OF THE INVENTION

Most computer application programs dating back more than about a decade use a text-based user interface, in which the user types commands on a keyboard, and output from the application is displayed on a text screen. With the advent of computer interface technology that supports the displays of graphical images, Graphical User Interfaces (GUI's) have become popular. A GUI application can be controlled through menu bars, buttons, sliders, or similar control elements drawn by the application on the display screen. The user interacts with a GUI application using a pointing device, such as a mouse, to move a cursor across the display and clicking a mouse button while pointing at a menu or one of the other graphical controls provided by the application.

Window systems allow multiple applications to run side-by-side on the same display by dividing the screen into separate, possibly overlapping, rectangular areas (windows). Window systems typically support GUI applications as well as older, text-based applications running in a window that emulates a character terminal. Examples of such window systems are the Apple Macintosh operating system, the X-Window system under the Unix operating system, Microsoft Windows running under DOS, and the IBM OS/2 Presentation Manager.

Integrated Graphical User Environments go one step further by supporting a graphical mode of interaction between different applications running in different windows. Examples of such environments are integrated application packages, e.g., Computer Aided Software Engineering (CASE) systems, as well as so-called Object Oriented User Interfaces (OOUI's). In a OOUI environment the user interacts with the system by manipulating iconic representations of system resources (data files, application programs, printers or other I/O devices, etc) on the screen. For example, to print a document, the user moves the cursor to the icon representing the file containing the document, presses down a mouse button, moves the cursor to an icon representing a printer, and releases the mouse button. For another example, a user might initiate a text editing operation on a pre-existing text file by using the mouse as above to select a text file icon in a directory browser window, move the icon to a window in which a text editor is running, and release the text file icon onto the window. This type of interaction is called "drag and drop", because an object selected in one window is "dragged" to another window where it is "dropped". Examples of OO GUI environments are the IBM OS/2 2.0 Work Place Shell, as well as so called "desktop managers" available for DOS (Norton Desktop) and Unix (Xdt, HP-VUE, OpenLook, etc).

A drawback of these environments is that applications integrated in the environment must follow a specific protocol to interact with the other applications. Typically, communicating among application programs in a graphical user interface environment requires all programs to follow a pre-established protocol, such as the communications conventions of the Andrew Toolkit. Existing applications cannot be integrated into the environment without re-engineering and rewriting the application. Processes which do not follow the protocol, i.e., are not implemented with the specific interfaces, are left non-integrated. For instance, in the text editing example discussed above, if the directory browser program and the text editor program are not part of the same integrated package, then the directory browser will not know how to communicate that the user desires to edit a selected file to the text editor. Thus, the directory browser will not be able to initiate the desired operation by the text editor.

Therefore, how to integrate existing and new applications without requiring such imbedded interfaces has been a continuing problem, and users have had limited ability to integrate the different applications which their systems support.

U.S. Pat. No. 5,075,847, issued to Fromme and titled "Method and Apparatus for Computer Program Encapsulation", describes a method for integrating a text-based application tool into a CASE system without modifying the application code. An interface description file specifies the layout of a graphical user interface for the application tool as well as the desired operations in response to interactions with the user interface and with other tools. However, the Fromme method is restricted to text-based applications only. As described in column 8, lines 49–53, > The application tools selected for encapsulation in accordance with the present invention must conform to the UNIX pipe model of communication. Communication with the application tool is in the form of character string inputs and character string outputs.

In the Fromme system, the user interface for the application, as specified in the interface description file, is created and controlled by the CASE system. The system uses the Unix pipe facility to control the application by sending commands as character strings to the standard-input stream (stdin) of the application and intercepting its standard-output stream (stdout) to display the output in a window created by the CASE system. Therefore, the Fromme method is unsuitable for integrating GUI applications into a graphical user environment, because such applications do not follow the UNIX pipe model. Rather, such GUI applications create their own user interface and cannot be controlled through stdin and stdout.

SUMMARY OF THE INVENTION

An object of this invention is to provide a method and apparatus for integrating existing text-based and GUI applications into an integrated graphical user environment without requiring the application code to be modified.

It is also an object of this invention to provide a method and apparatus for integrating an object, of or created by a first application having a first property, with a second application in a window, such that, to the user, the integration is carried out by a drag and drop operation.

To achieve these and other objects, there is provided in accordance with the invention a method for integrating applications into an integrated graphical user environment, such that, given an object from a first application having a first property, a second application having a second property performs an operation on, or otherwise integrates, the object from the first application. The method includes the steps of identifying a rule from a rule database which is compatible with the first and second properties, and which specifies an action for invoking the desired operation in the second application, and performing the action specified in the identified rule, thereby invoking the desired operation by the second application on the object.

A processing system according to the invention, supporting a plurality of application programs and objects, which have respective properties, includes a rule database containing a plurality of rules for integrating the application programs and the objects.

Each rule includes means for identifying which of the application programs and objects the rule applies to. In operation, an application program runs inside a window. The window has properties which reflect the properties of the application running inside the window. Therefore, in a preferred embodiment of the invention, the means for identifying includes a property of the object to be integrated with the application running in the window, and a window property. The identification is made by comparing the properties of the window and the object with properties specified in the rules.

Each rule also contains means for directing the processing system to invoke an operation by the second application compatibly with its property and the property of the object of the first application.

A computer program product according to the invention, for use with a processing system, includes a recording medium, such as a diskette, and means recorded thereon for directing the processing system to operate as follows.

Each rule also contains means for directing the processing system to invoke an operation by the second application compatibly with its property and the property of the object of the first application.

BRIEF DESCRIPTION OF THE DRAWINGS

FIG. 3 is a list of selection clause keywords and formats for the rules in the rule database 10 of FIG. 1, according to a preferred embodiment of the invention.

FIGS. 4A and 4B together make up a list of action clause keywords and formats for the rules in the rule database 10 of FIG. 1, according to a preferred embodiment of the invention.

FIG. 5 is a table of macro symbols used with the keywords of FIGS. 3, 4A, and 4B, according to a preferred embodiment of the invention.

DESCRIPTION OF THE PREFERRED EMBODIMENTS

Figure 1:
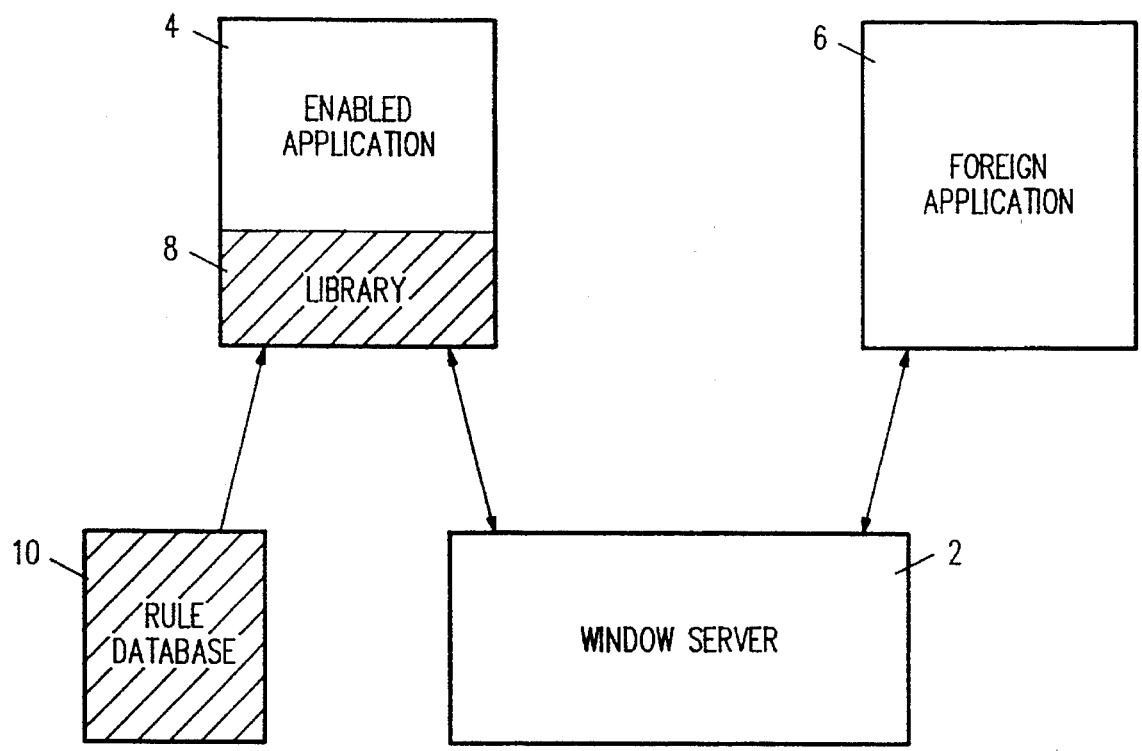
FIG. 1 is a system block diagram for a preferred implementation of the invention.

FIG. 1 is a system block diagram of a processing system employing an integrated graphical user environment. In this particular example, the environment is a windows environment, and the window system function is provided by a windows server 2. FIG. 1 shows an example of how an application that was written for an integrated graphical user environment, shown as an enabled application 4, interacts with an existing, unmodified GUI application, shown as a foreign application 6. An application written for the environment, such as the enabled application 4, uses a software library 8 that encapsulates the mechanism of the present invention, in a manner to be described.

The following describes how the system of FIG. 1 operates when the user selects an object in the enabled application 4 and drops it onto a window containing the foreign application 6. How the user initiates a drag and drop operation depends on how the enabled application 4 was programmed, and could have many different forms. In an OO GUI, for example, the user moves the cursor to an iconic representation of an object drawn by the enabled application 4, such as a file, directory, or other system resource, and presses down a mouse button. Alternatively, the user chooses an item from a menu created by the enabled application 4.

In either case, the enabled application 4 receives messages from the windows server 2 describing the user interaction as a stream of window events (e.g., cursor movement, button presses, etc.). When the enabled application 4 recognizes that the user wants to initiates a drag and drop, it calls into the library 8, passing as a parameter attributes of the object selected by the user (e.g., if the selected object represents a file, the file name, file type, last-modified time, etc). If the windows events indicate that the foreign application 6 is the target of the interaction, i.e., if the user releases the mouse button to drop the object onto a window created by the foreign application, then it is necessary to integrate the object with the foreign application 6. The integration is accomplished through reference to a rule database 10, in a manner to be described.

Figure 2:
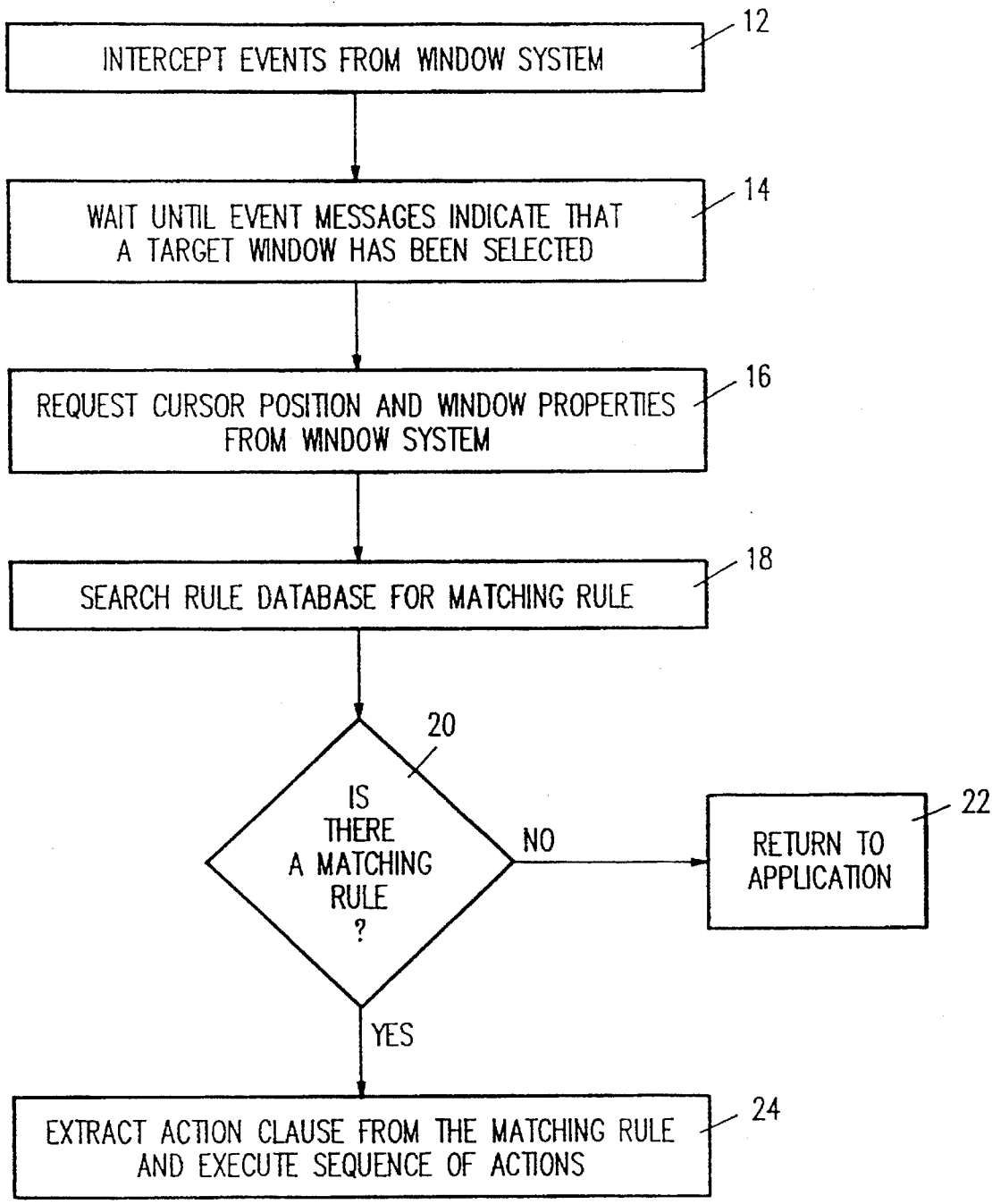
FIG. 2 is a flowchart showing the execution of a method according to the invention.

FIG. 2 is a flowchart showing the operation which is executed, according to the present invention, when the enabled application 4 makes such a call into the library 8. In a first step 12, the library 8 monitors messages from the window server 2. In this particular case, the library 8 monitors the window event messages from the windows server 2. These window events include cursor motion, through the use of a mouse, and mouse button pushes.

In step 14, the window events indicate that the mouse button has been released. That is, the user has used the mouse to select a window on the display. In response, in step 16 the library 8 sends a message to the windows server 2 to determine which window is located at the cursor position where the mouse button was released. In this example, the user releases the mouse button over a window created by the foreign application 6.

Prior to having released the mouse button, the user had used the mouse to select an object, having certain attributes, from the enabled application 4. By releasing the mouse button on the foreign object 6, the user has indicated his desire to integrate the object from the enabled application 4 with the foreign application 6. The library 8 also sends additional messages to the windows server 2 to obtain window properties, such as the window name, defined for this window. From the window properties, the properties of the application running in the window may be inferred, so that integrating the object with the window, in accordance with the window properties, in effect facilitates integration of the object and the application.

After the library 8 obtains this information, it consults the rule database 10, in step 18. The library 8 searches the rule file for a matching rule. For the present, a general description of the rules will be given. A more detailed description of the rules, with examples, appears below.

Each rule contains a "selection clause" that specifies a set of conditions on window properties and object attributes.

The selection clauses of the rules are examined, one by one, to compare the window properties and object attributes with those specified in the selection clauses of the rules. If the window properties obtained in step 14, as well as the attributes of the object selected by the user, satisfy these conditions, a matching rule is found and the search ends. Otherwise, the search continues by considering the next rule in the file.

Step 20 tests whether a matching rule was found. If no matching rule is found, then the library 8 detects an error condition (step 22) and returns control to the enabled application 4. In response, either no action is taken, or an appropriate action, such as displaying an error message, is taken. In one preferred embodiment, the error messages includes a return code stating the nature of the failure.

In addition to the selection clause, each rule contains an "action clause". If a matching rule is found, the library 8 proceeds by executing the sequence of actions specified by the matching rule's action clause (step 24). An action may specify either (a) a window event or events to be sent to the foreign application 6, or (b) external programs or shell scripts to be executed. For example, in an X-Windows environment, in the former case (a), the library 8 sends an XSendMessage-message to the windows server 2 containing the specified X-event and the identity of the window of the foreign application 6. The windows server 2 then forwards the message to the foreign application 6.

In the latter case (b), the library 8 executes a system call to the operating system to load and start the specified program. For instance, a text file created by a first text editor includes imbedded text formatting commands as per the first editor. If the user drags and drops the text file onto a second text editor which employs different imbedded text formatting commands, the rule would include a call to execute an external program for converting the commands in the file as per the first editor to the appropriate commands as per the second editor.

The method according to the invention integrates objects and applications in a variety of ways. For a first example, if a directory browser and a text editor are running in two windows, and the browser and the editor are not part of the same integrated package, then the method of the invention may be used to allow the user to select an object out of the directory browser window and drop it onto the editor window, to edit the object. In cases such as this, the rule should be designed in such a way that the windows events sent to the foreign application 6 simulate a user interaction that invokes the operation intended by the user when he/she initiated the drag and drop. However, the application need not operate on the object in this manner. As another example, the object could be an editor profile. In this case, dropping the profile onto the editor window causes the editor to be configured as per the profile. As yet another example, a help icon could be selected from a first window and dropped onto a second window in which an application is running. As a result, a help message for the application is displayed. In these cases, the rule starts an external program to perform the desired operation.

The action clause may be thought of as a program in a programming language, whose execution integrates the object and the application. In cases such as (b), where an external program is executed, the program is written in a programming language, such as C. In cases such as (a), the action clause of the rule itself serves as a program. As will be discussed in detail below, the action clause is written in terms of keywords, which serve as a programming language.

A detailed description of the rules in the rule data base 10 according to the preferred embodiment of the invention will now be described. As stated above, each rule includes a selection clause and an action clause. In the preferred embodiment, each one of these clauses includes one or more of a plurality of keywords, each keyword having a specified argument. The keywords for the selection clause according to the preferred embodiment of the invention are shown in FIG. 3. As shown, one keyword, "window", specifies a pattern for the name of the window on which the user has dragged and dropped an object. In an X-Windows environment, the keyword "window" is preferably the WM_NAME property of the window. Persons familiar with the X-Windows environment will recognize WM_NAME. From WM_NAME, or other suitable window properties it is possible to infer the properties of applications within the windows. Therefore, according to the invention, the window properties are used for determining, by selection clause, which rule is appropriate to use to integrate an object with the foreign application 6.

Another selection keyword is "type". As shown, the selection clause of the rule specifies the file type in accordance with the various symbols representing various file types. In a given situation in which a user has dropped an object of a particular type onto a particular type of window, the information regarding the window properties which the library 8 obtained from the server 2 in step 16 is compared against the selection clauses of the rules in the rule data base 10. In step 18, the rule data base search involves comparing the window properties and object attributes with the various patterns and file types specified in the selection keywords in each rule. Thus, a match is located, and the appropriate rule is identified.

FIGS. 4A and 4B together make up a list of action clause keywords and formats according to the preferred embodiment of the invention. As described above, once a match has been made between a rule in the rule data base 10 and the specified window properties and object attributes, the action specified in the action clause is executed to invoke the desired operation on the object. This is done by executing an existing program or shell script or by sending events. As shown in FIG. 4A, the "exec" keyword is used to specify the name of the external program to be executed. The directory within which this program executes is specified using the "cd" keyword. A sequence of keystroke events to be sent to the foreign application 6, such as a suitable keyboard command, is entered as a text string using the keyword "string". Various control keys on a keyboard are specified as being pressed or released using "key press" and the "key release" keywords. Similarly, mouse button presses and releases are specified using the "button", "button down", and "button up" keywords. A time delay is specified using the "wait" keyword. By default, these events are directed to the window on which the user has dropped the object. The events may be directed to a particular window other than this default window by specifying the window using the "pop up" keyword.

Finally, a result of the operation is specified using the "result" keyword. Various result codes are shown in FIG. 4B. The result code is returned to the enabled application 4 from which the object was dropped.

Depending on the size of the rule data base, there may be more than one rule whose selection clause matches a given user operation. In such situations, the rules in the rule data base are ordered such that the rule whose action clause is normally to be executed should appear in the rule data base before any other rules whose selection clauses also match the given user operation. Alternatively, other suitable criteria are used to determine which of the matching rules is to be executed under which circumstances.

Given the keywords in FIGS. 4A and 4B, it will be seen that either an external program or one or more event generating actions such as window events (cursor moves, mouse button pushes, etc.) may be specified in the action clause. If it is desired that some combination of external program execution and event generating actions is to be used, then appropriate sequencing, such as arranging the keywords in the rule in accordance with the sequence in which the actions are to be taken, are employed.

According to the invention, an object may be dropped on either an existing window, having an application, or on a background window or into a default environment, such as the desktop. In these latter cases, there is no application to which window events cound be sent. However, a rule with an appropriate action clause (using the "exec" keyword) can be used to invoke a desired behavior such as starting up a new instance of a text editing program, in a new window, to edit the object.

Rules in the rule data base 10 may also be classified into groups based on whether the object is to be dropped on the desktop or on a window. This classification scheme also includes a separate class of default rules which are to be applied if none of the earlier rules are applicable.

In many instances, predefined rules which anticipate integrating certain types of objects and applications that are likely to be integrated often may be provided. For instance, a computer program product according to the invention, such as a diskette containing software for use with a processing system, may include a predefined table of rules. On the other hand, a user may want to customize rules for his or her own particular use. Therefore, the invention preferably includes a method or means for allowing the user to customize his rule database. Either the user edits the rule database 10 in its entirety, or the rule database 10 includes a preset rule database and also a separate user-writable rule database.

In the preferred embodiment of the invention, various symbols for the arguments of the various keywords are specified conveniently using macros. In FIG. 5 a table of predefined macros, identified by the symbol "$", are given.

A few examples of rules will now be shown and described in detail. Reference to FIGS. 3, 4A, 4B, and 5 will enhance comprehension of these examples.

In the first example, the enabled application 4 is a directory browser, the foreign application 6 is the GNU-emacs text editor. When the user selects a file from the directory browser window and drops it on an emacs window, emacs should load the file so the user can edit it. The following rule in the rule database 10 will accomplish this:

window=[eE]macs.*type=F button=1 string="\033xfind-file\n$f\n"

The selection clause of this rule is:

window=[Ee]macs.*type=F

It specifies that this rule is triggered if a regular file ("type=F") is dropped on a window with a name that begins with "emacs" or "Emacs".

The action clause ("button=1 string=. . . ") specifies a button-down window event for mouse button one followed by a sequence of key-press events to be sent to the emacs window. The "$f" macro stands for the name of the dropped file when the rule is triggered. These events will cause emacs to execute the "find-file" function to load the file.

Next, a variation of the first example will be shown, in which the emacs "dired" function is invoked when a directory is dropped on an emacs window.

window=[eE]macs.*type=d button=1 string="\033xdired\n$f\n"

This example is similar to that shown above. The only differences compared to the other emacs rule are that the selection clause selects the rule only if a directory is dropped (type=d), and the action clause invokes the dired function instead of find-file.

In these first two examples, the foreign application can be driven entirely through keyboard events. Other applications require more complicated interactions involving menus and popup windows. In a third example, the enabled application 4 is a directory browser, and the foreign application 6 is the FrameMaker document preparation system. When the user selects a FrameMaker document in the directory browser window and drops it on the "open" button in the FrameMaker control window, FrameMaker should open a new edit-window allowing the user to view the selected document.

The following rule in the rule database 10 will accomplish this:

window="FrameMaker" type=F button=1 wait=2 popup="FrameMaker—Open" key=End key=CtrlBackSpace string=$f key=Return

The selection clause specifies that this rule is triggered if a regular file ("type=F") is dropped on a window named "FrameMaker". The action clause first sends a button-down window event for mouse button one to the FrameMaker window. The FrameMaker application creates a window named "FrameMaker—Open" containing a text field in which it expects the user to enter the name of the document to be viewed. The action clause specifies to wait for this window to be created and then simulates the user clearing the text field and entering the name of the document.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A processing system comprising:

means for supporting a plurality of application programs and objects thereof, the objects having a first plurality of respective properties, the means for supporting including means for supporting the application programs according to a second plurality of respective properties thereof; and a rule database including a plurality of rules for integrating the application programs and objects thereof, each of the rules including means for identifying the properties of one of the application programs and one of the objects thereof to which the rule applies, and means for invoking a desired operation by the one of the application programs, whose property is identified therein, on the one of the objects whose property is identified therein, the property of the one of the objects being incompatible with the property of the one of the application programs, the rule which applies to the one of the objects facilitating invocation of the desired operation.

2. A processing system as recited in claim 1, wherein each of the rules includes a selection clause which specifies the properties of the one of the objects and the one of the application programs in terms of keywords.

3. A processing system as recited in claim 1, wherein each of the rules includes an action clause which specifies an action to be taken by the processing system for invoking the desired operation by the application program whose property is identified therein in terms of keywords.

4. A processing system as recited in claim 3, wherein the action clause includes means for specifying an event generating action for invoking the desired operation related to the one of the application programs.

5. A processing system as recited in claim 3, wherein the action clause includes an identification of an external program to be executed for performing a desired operation related to the one of the application programs.

6. A processing system as recited in claim 1, further comprising means, operable responsive to an input command, for operating on an object of a first one of the application programs by a second one of the application programs, the means for identifying including means, operable responsive to the input command, for identifying a rule in the rule database including means for identifying the properties of the ones of the objects and the application programs.

7. A processing system as recited in claim 6, wherein the means for operating includes a windows server and a windows user input mechanism.

8. A method for integrating application programs into an integrated graphical user interface (GUI) processing environment, without requiring the application programs to be modified, the GUI processing environment being coupled to a store of a plurality of rules where at least one rule specifies an action to be carried out by an application program, such that a desired operation on a selected object in a first application program having a first property is operated upon by a second application program having a second property, wherein the first property defines a first protocol and a first interface, and the second property defines a second protocol and a second interface, the method comprising the steps of:

selecting a rule from the plurality of rules that corresponds to the first property and the second property, wherein the rule specifies an action to be carried out by the second application program in order to invoke the desired operation on the selected object in the first application program; and performing the action specified in the selected rule, thereby invoking the desired operation on the selected object.

9. The method as recited in claim 8, wherein the message that the object in the first application program has been selected for the desired operation is sent from a windows server, the command including a window event.

10. The method as recited in claim 9, wherein the message includes window events which make up a drag and drop operation of a symbol representing the object onto a window created by the second application program.

11. The method as recited in claim 8, wherein:

each rule includes a selection clause which specifies properties of respective objects and windows through the use of keywords; and the step of selecting a rule includes finding a rule in the store of the plurality of rules having a selection clause whose keywords specify the first and second properties.

12. The method as recited in claim 8, wherein:

the rule selected in the step of selecting a rule includes an action clause for executing a sequence of actions which invokes a desired operation by the second application program; and the method further comprises the step of executing the sequence of actions as per the action clause.

13. The method as recited in claim 12, wherein:

the action clause includes a keyword which specifies the sequence of actions; and the step of executing includes executing the sequence of actions specified by the keyword.

14. The method as recited in claim 13, wherein:

the keyword includes a specification of an event generating action for invoking the desired operation by the second application program; and the step of simulating includes sending an event to the second application program as per the event generating action specified by the keyword.

15. The method as recited in claim 13, wherein:

the keyword includes an identification of an external program to be executed for performing a desired operation related to the second application program; and the step of simulating includes executing the external program.

16. A computer program product, for causing computer implemented actions to occur in a computer processing system, the computer implemented actions enabling integration between a plurality of application programs and objects thereof, the application programs and objects having respective properties, the application programs and objects being supported by the processing system, the computer program product comprising:

a recording medium; and means, recorded on the recording medium, for directing the processing system to maintain a rule database containing a plurality of rules for integrating the application programs and objects thereof, each of the rules including means for identifying one of the application programs and one of the objects thereof to which the rule applies and means for directing the processing system to invoke a desired operation by the one of the application programs, whose property is identified therein, on the one of the objects whose property is identified therein, the property of the one of the objects being incompatible with the property of the one of the application programs, the rule which applies to the one of the objects facilitating invocation of the desired operation.

17. A computer program product as recited in claim 16, wherein the means for directing to maintain includes means, recorded on the recording medium, for directing the processing system to maintain the rule database such that each of the rules includes a selection clause which specifies the properties of the one of the objects and the one of the application programs in terms of keywords.

18. A computer program product as recited in claim 16, wherein the means for directing to maintain includes means, recorded on the recording medium, for directing the processing system to maintain the rule database such that each of the rules includes an action clause which specifies an action to be taken by the processing system for invoking the desired operation by the application program whose property is identified therein in terms of keywords.

19. A computer program product as recited in claim 18, wherein the means for directing to maintain includes means, recorded on the recording medium, for directing the processing system to maintain the rule database such that each of the rules includes an action clause which includes means for specifying an event generating action for invoking the desired operation by the one of the application programs.

20. A computer program product as recited in claim 18, wherein the means for directing to maintain includes means, recorded on the recording medium, for directing the processing system to maintain the rule database such that each of the rules includes an action clause which includes an identification of an external program to be executed for performing a desired operation related to the one of the application programs.

21. A computer program product as recited in claim 16, wherein the means for directing to maintain includes means, recorded on the recording medium, for directing the processing system, in response to an input command, to operate on an object of a first one of the application programs by a second one of the application programs, the means for directing to identify including means, recorded on the recording medium, for directing the processing system, responsive to the input command, to identify a rule in the rule database which includes means for identifying the properties of the ones of the objects and the application programs.

22. A computer program product as recited in claim 21, wherein the processing system includes a windows server, and a windows user input mechanism, and the means for directing to operate includes means, recorded on the recording medium, for directing the processing system, in response to the input command, to identify the command as a window event.

\* \* \* \* \*